United States Patent
Li et al.

(10) Patent No.: US 10,939,287 B2
(45) Date of Patent: Mar. 2, 2021

(54) METHOD OF BATCH AUTOMATIC NETWORK CONFIGURATION OF WIFI DEVICES, TERMINAL EQUIPMENT AND STORAGE MEDIUM

(71) Applicant: YEALINK (XIAMEN) NETWORK TECHNOLOGY CO., LTD., Fujian (CN)

(72) Inventors: Jinghong Li, Fujian (CN); Lianchang Zhang, Fujian (CN); Jiwei Zhou, Fujian (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 16/836,409

(22) Filed: Mar. 31, 2020

(65) Prior Publication Data
US 2021/0014675 A1   Jan. 14, 2021

(30) Foreign Application Priority Data
Jul. 11, 2019   (CN) .......................... 201910626867.0

(51) Int. Cl.
*H04M 1/68*   (2006.01)
*H04W 12/00*   (2021.01)
(Continued)

(52) U.S. Cl.
CPC ..... *H04W 12/0013* (2019.01); *H04L 41/0806* (2013.01); *H04L 63/0435* (2013.01);
(Continued)

(58) Field of Classification Search
CPC ....... H04W 12/0013; H04W 12/04033; H04W 63/061; H04L 41/0806; H04L 63/0435; H04M 1/72519; H04M 1/72522
(Continued)

(56) References Cited

U.S. PATENT DOCUMENTS

2011/0093516 A1* 4/2011 Geng ................. H04L 41/0859
707/827
2012/0315839 A1* 12/2012 Mumcuoglu ......... H04W 4/029
455/2.01

(Continued)

*Primary Examiner* — Danh C Le (57) ABSTRACT

The present disclosure discloses a method of batch automatic network configuration of WiFi devices, terminal equipment and storage medium. The method comprises: deploying a network configuration AP hotspot for configuration and distribution and releasing a network configuration signal; searching the network configuration signal after the device to be configured enters network configuration state, and calculating whether the AP hotspot currently searched is the network configuration AP hotspot by adopting key conversion algorithm; if yes, the device to be configured connecting to the network configuration AP hotspot; downloading network configuration data in the network configuration AP hotspot through file transfer protocol, decrypting and verifying the network configuration data, updating network configuration settings, and completing the network configuration after the device to be configured successfully connects to the network configuration AP hotspot. The present disclosure can automatically configure multiple WiFi devices quickly and efficiently at one time.

14 Claims, 6 Drawing Sheets

(51) Int. Cl.
  *H04L 29/06*   (2006.01)
  *H04W 12/04*   (2021.01)
  *H04L 12/24*   (2006.01)
  *H04M 1/725*   (2021.01)

(52) U.S. Cl.
  CPC ..... *H04L 63/061* (2013.01); *H04W 12/04033* (2019.01); *H04M 1/72519* (2013.01); *H04M 1/72522* (2013.01)

(58) Field of Classification Search
  USPC ........................................ 455/411, 418, 550.1
  See application file for complete search history.

(56) References Cited

U.S. PATENT DOCUMENTS

| | | | |
|---|---|---|---|
| 2014/0143435 A1* | 5/2014 | Jung | H04W 4/21 709/228 |
| 2015/0081859 A1* | 3/2015 | Xu | H04L 41/0886 709/222 |
| 2015/0143473 A1* | 5/2015 | Jung | H04W 12/06 726/4 |
| 2015/0278824 A1* | 10/2015 | Zabar | G06Q 10/1053 705/317 |
| 2016/0007265 A1* | 1/2016 | Xiu | H04W 40/02 370/235 |
| 2016/0073271 A1* | 3/2016 | Schultz | H04W 12/0804 455/404.1 |
| 2017/0164418 A1* | 6/2017 | Tsai | H04W 76/14 |
| 2017/0366421 A1* | 12/2017 | Dam | H04L 41/046 |

\* cited by examiner

METHOD OF BATCH AUTOMATIC NETWORK CONFIGURATION OF WIFI DEVICES, TERMINAL EQUIPMENT AND STORAGE MEDIUM

CROSS-REFERENCE TO RELATED APPLICATIONS

The present application claims the benefit of Chinese Patent Application No. 201910626867.0 filed on Jul. 11, 2019, the contents of which are hereby incorporated by reference.

FIELD OF THE DISCLOSURE

The disclosure relates to the technical field of network configuration, in particular to a method of batch automatic network configuration of WiFi devices, terminal equipment and storage medium.

BACKGROUND OF THE DISCLOSURE

With the rapid development of the Internet of things, many traditional home appliances and new electronic devices have a lot of needs to use WiFi for networking, but many devices do not have an operable interactive interface for configuring the name and password of WiFi. If an interactive interface is added only for configuring WiFi, the cost will rise a lot, and WiFi configuration is only implemented when the device is deployed and will not be changed later, it is very wasteful to add a one-time interactive interface, and it is also very tedious for users to operate, which is not conducive to batch deployment.

The existing WiFi device batch network configuration technology mainly comprises WiFi WPS mode and Airkiss type protocol. However, in the process of research and practice of the prior art, the inventor of the disclosure found that there are the following defects in the prior art: The WiFi WPS mode configuration takes a long time, it takes tens of seconds to complete the network configuration of a device, and mature cracking methods have emerged to make WiFi WPS mode has low security. The Airkiss type protocol is not stable and easy to be disturbed. The larger the amount of data carried, the lower the success rate of network configuration, the longer the network configuration time, and the lower the efficiency of network configuration. Although the Airkiss type protocol may support multiple devices to be configured WiFi, it is impossible to confirm which devices have been configured successfully and the WiFi chip of the device to be configured should support the monitor mode, otherwise it cannot be configured, which has certain limitations. Therefore, a way to automatically configure the WiFi of devices in batches is needed, so as to improve the security and efficiency of the automatic network configuration.

SUMMARY OF THE DISCLOSURE

The present disclosure aims at providing a method of batch automatic network configuration of WiFi devices, terminal equipment and storage medium, which can quickly batch automatic network configuration of WiFi devices.

For the realization of the above-mentioned aim, one embodiment of the present disclosure provides a method of batch automatic network configuration of WiFi devices, which at least comprises the following steps:

deploying a network configuration AP hotspot for configuration and distribution and releasing a network configuration signal;

searching the network configuration signal after the device to be configured enters network configuration state, and calculating whether the AP hotspot currently searched is the network configuration AP hotspot by adopting key conversion algorithm;

if yes, the device to be configured connecting to the network configuration AP hotspot;

after the device to be configured successfully connects to the network configuration AP hotspot, downloading network configuration data in the network configuration AP hotspot through file transfer protocol, decrypting and verifying the network configuration data, updating network configuration settings, and completing the network configuration.

Preferably, the method of batch automatic network configuration of WiFi devices further comprises:

encrypting the configuration data of the network configuration AP hotspot by adopting a multi-layer encryption mode.

Preferably, the network configuration data comprises configuration information of several AP hotspots finally connected.

Preferably, said encrypting the configuration data of the network configuration AP hotspot by adopting a multi-layer encryption mode is specifically:

calculating CRC32 check sum of the data to be encrypted, and placing the check sum in the head of the network configuration data;

using BASE64 algorithm to encrypt the data;

encrypting the encrypted data repeatedly five times by adopting AES symmetric encryption algorithm to get the final encrypted data.

Preferably, said calculating whether the AP hotspot currently searched is the network configuration AP hotspot by adopting key conversion algorithm is specifically:

obtaining BSSID, encryption mode and support rate information of the AP hotspot currently searched;

combining public information of the AP hotspot with manufacturer specific key thereof to perform BASE64 conversion;

hashing the BASE64 conversion result by adopting SHA algorithm to get corresponding hash result;

selecting a part of specific bits in the hash result and convert them to a string which is used as a hotspot name, and selecting another part of the specific bits in the hash result as a WiFi password.

Another embodiment of the present disclosure provides a terminal equipment for batch automatic network configuration of WiFi devices, which comprises:

an AP deploying module, which is configured to deploy a network configuration AP hotspot for configuration and distribution and release network configuration signal;

a matching module, which is configured to search the network configuration signal after the device to be configured enters network configuration state, and calculate whether the AP hotspot currently searched is the network configuration AP hotspot by adopting key conversion algorithm; if yes, the device to be configured connects to the network configuration AP hotspot;

a network configuration module, which is configured to download network configuration data in the network configuration AP hotspot through file transfer protocol, decrypt and verify the network configuration data, update network configuration settings, and complete the network configuration after the device to be configured successfully connects to the network configuration AP hotspot.

Preferably, the terminal equipment for batch automatic network configuration of WiFi devices further comprises:

an encryption module, which is configured for encrypting the configuration data of the network configuration AP hotspot by adopting a multi-layer encryption mode.

Preferably, said encrypting the configuration data of the network configuration AP hotspot by adopting a multi-layer encryption mode is specifically:

calculating CRC32 check sum of the data to be encrypted, and placing the check sum in the head of the network configuration data;

using BASE64 algorithm to encrypt the data;

encrypting the encrypted data repeatedly five times by adopting AES symmetric encryption algorithm to get the final encrypted data.

Preferably, said calculating whether the AP hotspot currently searched is the network configuration AP hotspot by adopting key conversion algorithm is specifically:

obtaining BSSID, encryption mode and support rate information of the AP hotspot currently searched;

combining public information of the AP hotspot with manufacturer specific key thereof to perform BASE64 conversion;

hashing the BASE64 conversion result by adopting SHA algorithm to get corresponding hash result;

selecting a part of specific bits in the hash result and convert them to a string which is used as a hotspot name, and selecting another part of the specific bits in the hash result as a WiFi password.

Another embodiment of the present disclosure further provides a computer-readable storage medium, the computer-readable storage medium comprises a stored computer program, wherein when the computer program is running, the device on which the computer-readable storage medium is located is controlled to perform the method of batch automatic network configuration of WiFi devices.

The embodiments of the present disclosure have the following beneficial effects:

Some embodiments of the present disclosure provide a method of batch automatic network configuration of WiFi devices, terminal equipment and storage medium. The method comprises: deploying a network configuration AP hotspot for configuration and distribution and releasing a network configuration signal; searching the network configuration signal after the device to be configured enters network configuration state, and calculating whether the AP hotspot currently searched is the network configuration AP hotspot by adopting key conversion algorithm; if yes, the device to be configured connecting to the network configuration AP hotspot; downloading network configuration data in the network configuration AP hotspot through file transfer protocol, decrypting and verifying the network configuration data, updating network configuration settings, and completing the network configuration after the device to be configured successfully connects to the network configuration AP hotspot. The present disclosure can automatically configure multiple WiFi devices quickly and efficiently at one time, improve the security and stability of automatic network configuration, and reduce the cost of automatic network configuration.

DETAILED DESCRIPTION OF ILLUSTRATED EMBODIMENTS

In the following, the technical solutions in the embodiments of the present disclosure are clearly and completely described with reference to the drawings in the embodiments of the present disclosure. Obviously, the described embodiments are only a part of the embodiments of the present disclosure, but not all of the embodiments. Based on the embodiments of the present disclosure, all other embodiments obtained by those skilled in the art without creative efforts are within the scope of the present disclosure.

Refer to FIGS. 1-5.

Figure 1:
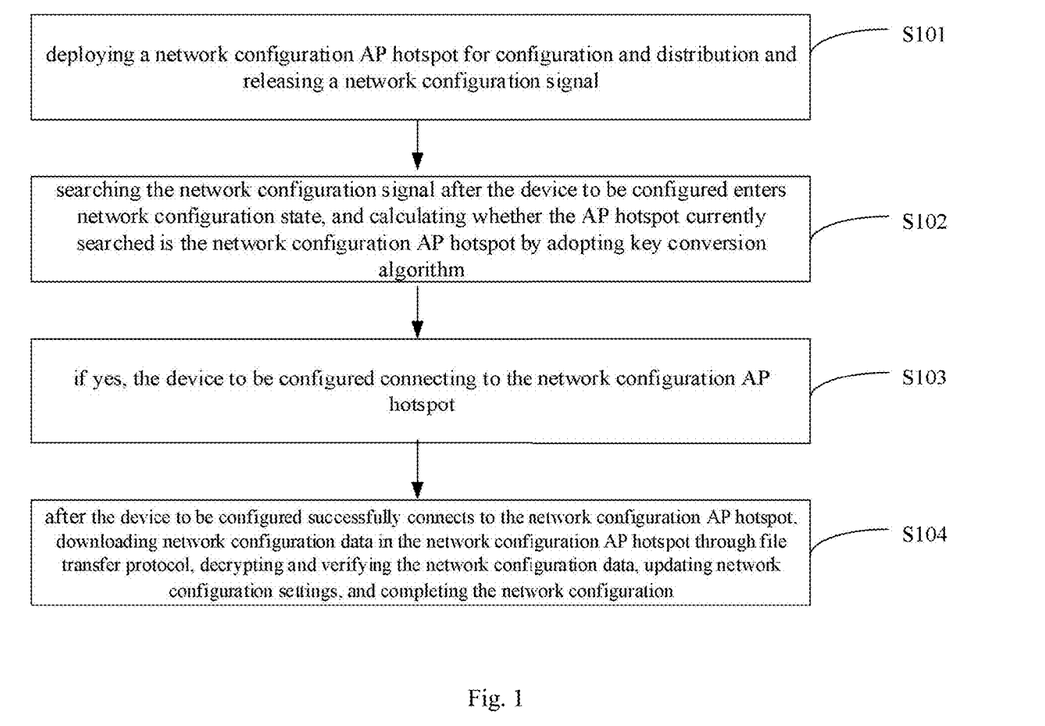
FIG. 1 is a schematic flow diagram of a method of batch automatic network configuration of WiFi devices according to one embodiment of the present disclosure.

As shown in FIGS. 1-5, the present embodiment provides a method of batch automatic network configuration of WiFi devices, which at least comprises the following steps:

S101, deploying a network configuration AP hotspot for configuration and distribution and releasing a network configuration signal;

Specifically, for step S101, deploying an AP hotspot specialized for configuration and distribution (network configuration AP for short). The name and password of the network configuration AP are public information that can be inquired through external devices, such as AP MAC address, encryption mode, channel, support rate and other information.

S102, searching the network configuration signal after the device to be configured enters network configuration state, and calculating whether the AP hotspot currently searched is the network configuration AP hotspot by adopting key conversion algorithm;

Specifically, for step S102, the device to be configured scans AP hotspots through WiFi, and performs the same conversion calculation for each scanned AP hotspot, and when the name of the AP is found to be consistent with its conversion result, discovery of the network configuration AP is completed. When the device to be configured conducts WiFi scan, it can obtain MAC address, channel, encryption mode, support rate and other information of any AP that sends out signal. When the network configuration AP generates its SSID and password, it will convert these information based on these public information several times through symmetric encryption algorithms such as AES and SHA hash algorithm. During the conversion process, the manufacturer specific key (the manufacturer key may be a string or binary key) may be added. After the conversion, the data of specific bits can be selected and converted into a string through the BASE64 algorithm. One part of the string is used as the name of the network configuration AP, and the other part thereof is used as the password of the network configuration AP.

S103, if yes, the device to be configured connecting to the network configuration AP hotspot.

Specifically, for step S103, the device to be configured performs the same conversion for each scanned signal, if the name of the network configuration AP is consistent with the conversion result, and the device to be configured can connect to the network configuration AP, then the device to be configured matches the network configuration AP, otherwise, tries other APs.

S104, after the device to be configured successfully connects to the network configuration AP hotspot, downloading network configuration data in the network configuration AP hotspot through file transfer protocol, decrypting and verifying the network configuration data, updating network configuration settings, and completing the network configuration.

Specifically, for step S104, the security and stability of the automatic network configuration are improved by decrypting and verifying the network configuration data.

Figure 2:
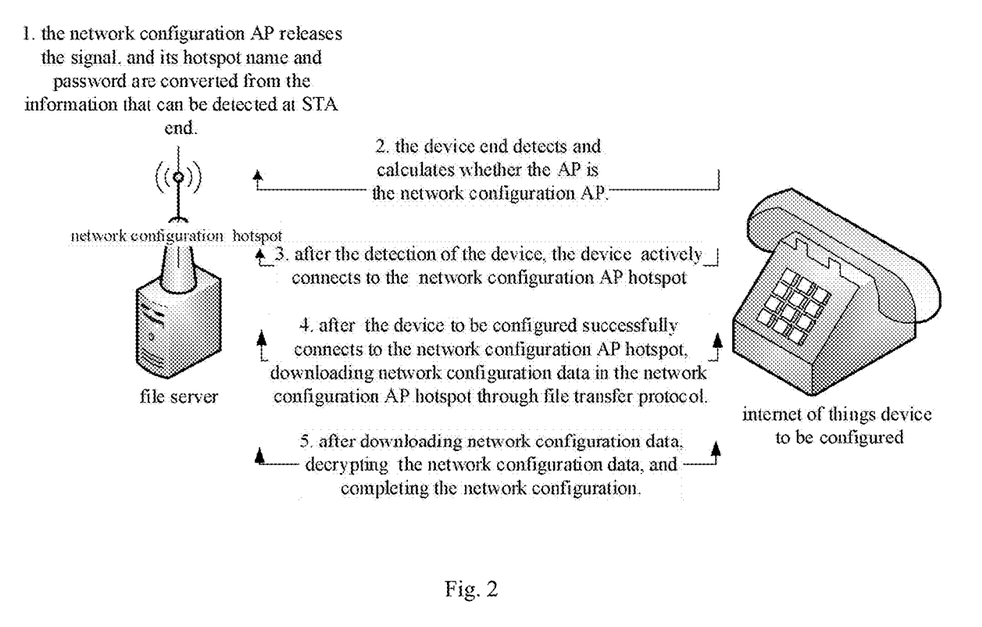
FIG. 2 is a schematic flow diagram of another method of batch automatic network configuration of WiFi devices according to one embodiment of the present disclosure.

In a specific embodiment, as shown in FIG. 2, the embodiment of the present disclosure also provides an implementation process of the method of batch automatic network configuration of WiFi devices.

Figure 3:
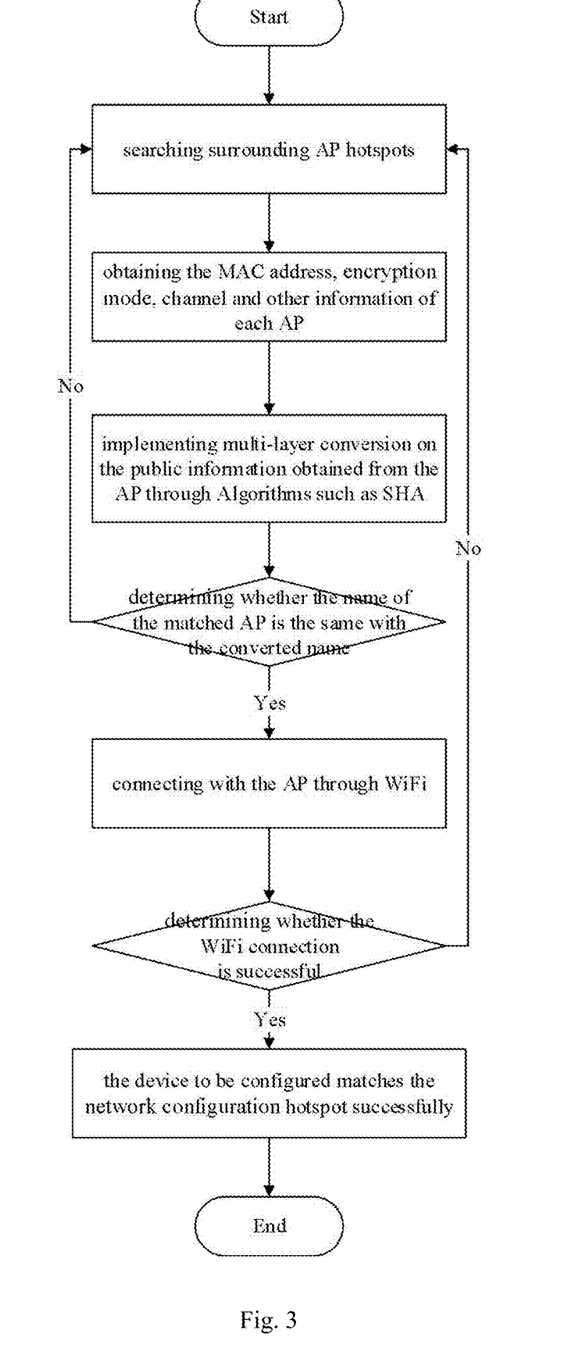
FIG. 3 is a schematic flow diagram of a method for configuring a network of devices to be configured according to one embodiment of the present disclosure.

Specifically, as shown in FIG. 3, the embodiment of the disclosure also provides a work process for the devices to be configured, and the steps thereof are as follows: searching surrounding AP hotspots to obtain the MAC address, encryption mode, channel and other information of each AP; implementing multi-layer conversion on the public information obtained from the AP through Algorithms such as SHA and determining whether the name of the matched AP is the same with the converted name, if yes, connecting with the AP through WiFi; if not, searching the surrounding AP hotspots again, and repeating the above steps; after the WiFi connection is successful, the device to be configured matches the network configuration hotspot successfully.

In a preferred embodiment, the method of batch automatic network configuration of WiFi devices further comprises:

encrypting the configuration data of the network configuration AP hotspot by adopting a multi-layer encryption mode.

Specifically, a symmetric encryption algorithm is adopted, and specific bits of data in the encryption result are selected as the name and key of the AP.

In a preferred embodiment, the network configuration data comprises configuration information of several AP hotspots finally connected.

Specifically, the network configuration data comprises configuration information of the final AP to be connected, and may contain the information of multiple APs. In addition, it may also contain other configuration information. Take the device in this embodiment as an example, it may also contain configuration information such as account number.

In a preferred embodiment, said encrypting the configuration data of the network configuration AP hotspot by adopting a multi-layer encryption mode is specifically:

calculating CRC32 check sum of the data to be encrypted, and placing the check sum in the head of the network configuration data;

using BASE64 algorithm to encrypt the data;

encrypting the encrypted data repeatedly five times by adopting AES symmetric encryption algorithm to get the final encrypted data.

Figure 4:
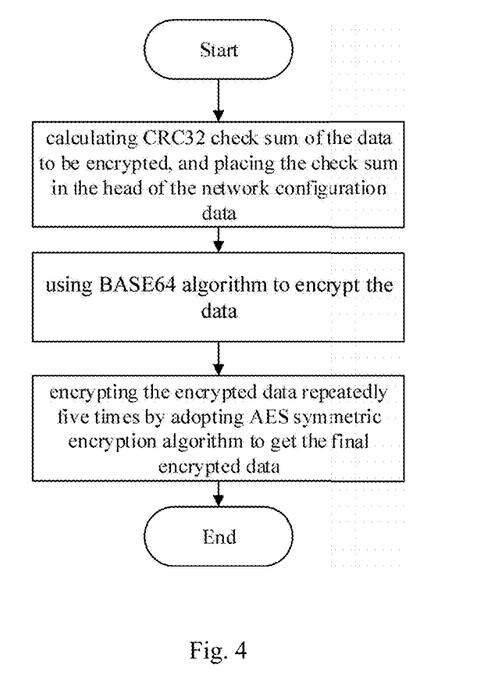
FIG. 4 is a schematic flow diagram of a multi-layer encryption mode according to one embodiment of the present disclosure.

Specifically, as the multi-layer encryption process shown in FIG. 4, the network configuration AP is set to WPA2-PSK+AES encryption mode which is the encryption mode with the highest WiFi security currently. At the same time, configuration content is encrypted by multiple encryption modes, such as AES-256, AES-512 and BASE64, so as to further improve the security. Meanwhile, for each different network configuration AP, its name, password and file encryption key are all one password for one device, which makes the data hard to be cracked.

In a preferred embodiment, said calculating whether the AP hotspot currently searched is the network configuration AP hotspot by adopting key conversion algorithm is specifically:

obtaining BSSID, encryption mode and support rate information of the AP hotspot currently searched;

combining public information of the AP hotspot with manufacturer specific key thereof to perform BASE64 conversion;

hashing the BASE64 conversion result by adopting SHA algorithm to get corresponding hash result;

selecting a part of specific bits in the hash result and convert them to a string which is used as a hotspot name, and selecting another part of the specific bits in the hash result as a WiFi password.

Figure 5:
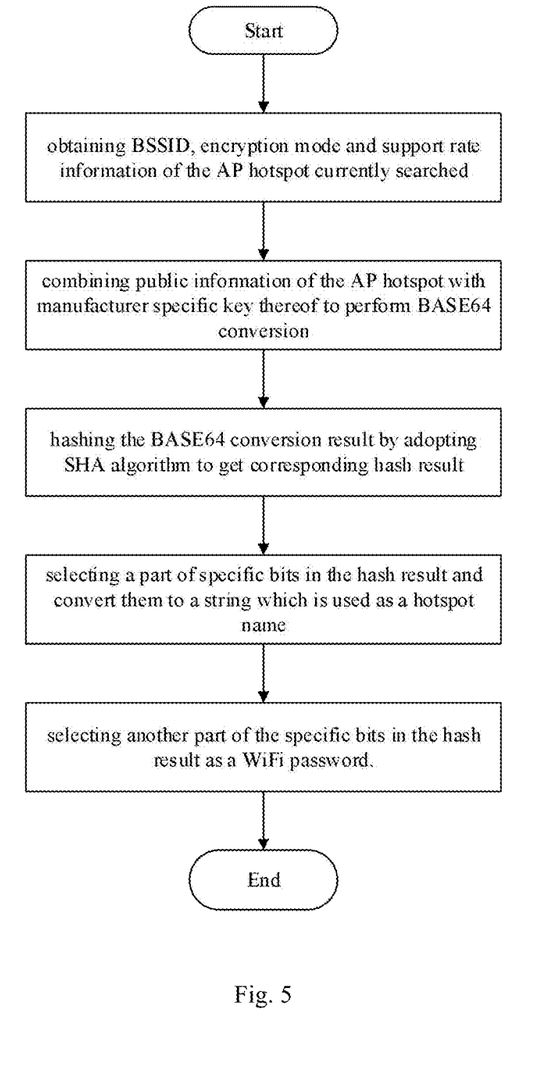
FIG. 5 is a schematic flow diagram of the conversion of the name and password of the network configuration AP according to one embodiment of the present disclosure.

Specifically, as the conversion process of the name and password of the network configuration AP shown in FIG. 5, the key may be a string of any length or binary data, and it is not limited to any format.

The present embodiment provides a method of batch automatic network configuration of WiFi devices, which comprises: deploying a network configuration AP hotspot for configuration and distribution and release a network configuration signal; searching the network configuration signal after the device to be configured enters network configuration state, and calculating whether the AP hotspot currently searched is the network configuration AP hotspot by adopting key conversion algorithm; if yes, the device to be configured connecting to the network configuration AP hotspot; after the device to be configured successfully connects to the network configuration AP hotspot, downloading network configuration data in the network configuration AP hotspot through file transfer protocol, decrypting and verifying the network configuration data, updating network configuration settings, and completing the network configuration.

The present embodiment can automatically configure multiple WiFi devices quickly and efficiently at one time, and the number of connected devices completely depends on the hardware capability. Even ordinary mobile phones can configure more than ten devices at a time. Since the data of network configuration is generally small, only tens of kilobytes, the whole network configuration process, including WiFi connection, data download and decryption, can be completed in 10 seconds. There is no requirement for the device end to be configured in the whole scheme of network configuration, only a WiFi function of its own is required. The network configuration AP only needs a hotspot function and a file download server function. Therefore, the network configuration AP can be a simple smart phone. In the deployment process, the smart phone can be used for mobile deployment, which is convenient and low cost. Because each device needs to interact with the network configuration AP, the network configuration AP can know exactly how many devices have been successfully configured. The network configuration AP can send multiple WiFi configurations and other configurations to the devices to be configured at one time, which greatly reduces the workload of deployment. Refer to FIGS. 2-6.

Figure 6:
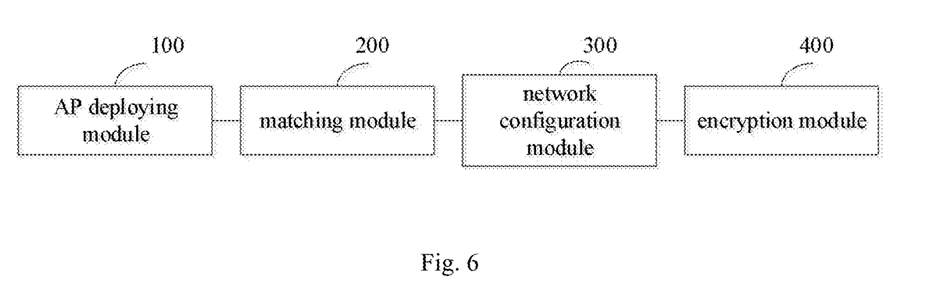
FIG. 6 is a schematic structural diagram of a terminal equipment for batch automatic network configuration of WiFi devices according to one embodiment of the present disclosure.

As shown in FIG. 6, this embodiment of the present disclosure provides a terminal equipment for batch automatic network configuration of WiFi devices, which comprises:

an AP deploying module 100, a matching module 200 and a network configuration module 300.

The deploy AP module 100 is configured to deploy a network configuration AP hotspot for configuration and distribution and release a network configuration signal;

Specifically, for the AP deploying module 100, it deploys an AP hotspot specialized for configuration and distribution (network configuration AP for short). The name and password of the network configuration AP are public information that can be inquired through external devices, such as AP MAC address, encryption mode, channel, support rate and other information.

The matching module 200 is configured to search the network configuration signal after the device to be configured enters network configuration state, and calculate whether the AP hotspot currently searched is the network configuration AP hotspot by adopting key conversion algorithm; if yes, the device to be configured connects to the network configuration AP hotspot;

Specifically, for the matching module 200, the device to be configured scans AP hotspots through WiFi, and performs the same conversion calculation for each scanned AP hotspot, and when the name of AP is found to be consistent with its conversion result, discovery of network configuration AP is completed. When the device to be configured conducts WiFi scan, it can obtain MAC address, channel, encryption mode, support rate and other information of any AP that sends out a signal. When the network configuration AP generates its SSID and password, it will convert these information based on these public information several times through symmetric encryption algorithms such as AES and SHA hash algorithm. During the conversion process, manufacturer specific key (the manufacturer key may be a string or binary key) may be added. After the conversion, data of specific bits can be selected and converted into a string through BASE64 algorithm, one part of the string is used as the name of the network configuration AP, and the other part of the string is used as the password of the network configuration AP. The device to be configured performs the same conversion for each scanned signal, if the name of the network configuration AP is consistent with the conversion result, and the device to be configured can connect to the network configuration AP, then the device to be configured matches the network configuration AP, otherwise, tries other APs.

The network configuration module 300 is configured to download network configuration data in the network configuration AP hotspot through file transfer protocol, decrypt and verify the network configuration data, update network configuration settings, and complete the network configuration after the device to be configured successfully connects to the network configuration AP hotspot.

Specifically, for the network configuration module 300, the security and stability of the automatic network configuration are improved by decrypting and verifying the network configuration data.

In the specific embodiment, as shown in FIG. 2, the embodiment of the present disclosure also provides an implementation process of the method of batch automatic network configuration of WiFi devices.

Specifically, as shown in FIG. 3, the embodiment of the disclosure also provides a work process for the devices to be configured, and the steps thereof are as follows: searching surrounding AP hotspots to obtain MAC address, encryption mode, channel and other information of each AP; implementing multi-layer conversion on the public information obtained from the AP through Algorithms such as SHA and determining whether the name of the matched AP is the same with the converted name, if yes, connecting with the AP through WiFi; if not, searching the surrounding AP hotspots again, and repeating the above steps; after the WiFi connection is successful, the device to be configured matches the network configuration hotspot successfully.

In a preferred embodiment, the terminal equipment for batch automatic network configuration of WiFi devices further comprises an encryption module 400.

The encryption module 400 is configured for encrypting the configuration data of the network configuration AP hotspot by adopting a multi-layer encryption mode.

Specifically, a symmetric encryption algorithm is adopted, and specific bits of data in the encryption result are selected as the name and key of the AP.

In a preferred embodiment, the network configuration data comprises configuration information of several AP hotspots finally connected.

Specifically, the network configuration data comprises configuration information of the final AP to be connected, and may contain the information of multiple APs. In addition, it may also contain other configuration information. Take the device in this embodiment as an example, it may also contain configuration information such as account number.

In a preferred embodiment, said encrypting the configuration data of the network configuration AP hotspot by adopting a multi-layer encryption mode is specifically:

calculating CRC32 check sum of the data to be encrypted, and placing the check sum in the head of the network configuration data;

using BASE64 algorithm to encrypt the data;

encrypting the encrypted data repeatedly five times by adopting AES symmetric encryption algorithm to get the final encrypted data.

Specifically, as the multi-layer encryption process shown in FIG. 4, network configuration AP is set to a WPA2-PSK+AES encryption mode which is the encryption mode with the highest WiFi security currently. At the same time, the configuration content can be implemented a multi-layer encryption by multiple encryption modes, such as AES-256, AES-512 and BASE64, so as to further improve the security. Meanwhile, for each different network configuration AP, its name, password and file encryption key are all one password for one device, which makes the data hard to be cracked.

In a preferred embodiment, said calculating whether the AP hotspot currently searched is the network configuration AP hotspot by adopting key conversion algorithm is specifically:

obtaining BSSID, encryption mode and support rate information of the AP hotspot currently searched;

combining public information of the AP hotspot with manufacturer specific key thereof to perform BASE64 conversion;

hashing the BASE64 conversion result by adopting SHA algorithm to get corresponding hash result;

selecting a part of specific bits in the hash result and convert them to a string which is used as a hotspot name, and selecting another part of the specific bits in the hash result as a WiFi password.

Specifically, as the conversion process of the name and password of the network configuration AP shown in FIG. 5, the key may be a string of any length or binary data, and it is not limited to any format.

The present embodiment provides a terminal equipment for batch automatic network configuration of WiFi devices, the terminal equipment comprises an AP deploying module which is configured to deploy a network configuration AP hotspot for configuration and distribution and release a network configuration signal; a matching module which is configured to search the network configuration signal after the device to be configured enter network configuration state, and calculate whether the AP hotspot currently searched is the network configuration AP hotspot by adopting key conversion algorithm; if yes, the device to be configured connects to the network configuration AP hotspot; a network configuration module which is configured to download network configuration data in the network configuration AP hotspot through file transfer protocol, decrypt and verify the network configuration data, update network configuration settings, and complete the network configuration after the device to be configured successfully connects to the network configuration AP hotspot.

The present embodiment can automatically configure multiple WiFi devices quickly and efficiently at one time, and the number of connected devices completely depends on the hardware capability. Even ordinary mobile phones can configure more than ten devices at a time. Since the data of network configuration is generally small, only tens of kilobytes, the whole network configuration process, including WiFi connection, data download and decryption, can be completed in 10 seconds. There is no requirement for the device end to be configured in the whole scheme of network configuration, only a WiFi function of its own is required. The network configuration AP only needs a hotspot function and a file download server function. Therefore, the network configuration AP can be a simple smart phone. In the deployment process, the smart phone can be used for mobile deployment, which is convenient and low cost. Because each device needs to interact with the network configuration AP, the network configuration AP can know exactly how many devices have been successfully configured. The network configuration AP can send multiple WiFi configurations and other configurations to the devices to be configured at one time, which greatly reduces the workload of deployment.

Another embodiment of the present disclosure also provides a computer-readable storage medium which comprises a stored computer program, wherein when the computer program is running, the device on which the computer-readable storage medium is located is controlled to perform the method of batch automatic network configuration of WiFi devices.

Some embodiments of the present disclosure provide a method of batch automatic network configuration of WiFi devices, terminal equipment and storage medium. The method comprises: deploying a network configuration AP hotspot for configuration and distribution and releasing a network configuration signal; searching the network configuration signal after the device to be configured enters network configuration state, and calculating whether the AP hotspot currently searched is the network configuration AP hotspot by adopting key conversion algorithm; if yes, the device to be configured connecting to the network configuration AP hotspot; downloading network configuration data in the network configuration AP hotspot through file transfer protocol, decrypting and verifying the network configuration data, updating network configuration settings, and completing the network configuration after the device to be configured successfully connects to the network configuration AP hotspot. The present disclosure can automatically configure multiple WiFi devices quickly and efficiently at one time, improve the security and stability of automatic network configuration, and reduce the cost of automatic network configuration.

The above-mentioned embodiments are the preferred embodiments of the present disclosure, and it should be noted that those skilled in the art can also make several improvements and modifications without departing from the principles of the present disclosure. These improvements and modifications are also in the protection scope of the present disclosure.

It can be understood by those skilled in the art that the whole or part of the flow in the method of the above embodiments can be realized by instructing related hardware through a computer program. The program can be stored in a computer-readable storage medium, the program, when runs, may include processes as described in the above embodiments of each method. Among them, the storage medium can be disk, optical disc, Read-Only Memory (ROM) or Random Access Memory (RAM), etc.

What is claimed is:

1. A method of batch automatic network configuration of WiFi devices, wherein the method at least comprises the following steps:

deploying a network configuration AP hotspot for configuration and distribution and releasing a network configuration signal;

searching the network configuration signal after the device to be configured enters network configuration state, and calculating whether the AP hotspot currently searched is the network configuration AP hotspot by adopting key conversion algorithm;

if yes, the device to be configured connecting to the network configuration AP hotspot;

after the device to be configured successfully connects to the network configuration AP hotspot, downloading network configuration data in the network configuration AP hotspot through file transfer protocol, decrypting and verifying the network configuration data, updating network configuration settings, and completing the network configuration;

encrypting the configuration data of the network configuration AP hotspot by adopting a multi-layer encryption mode;

wherein said encrypting the configuration data of the network configuration AP hotspot by adopting a multi-layer encryption mode is specifically:

calculating CRC32 check sum of the data to be encrypted, and placing the check sum in the head of the network configuration data;

using BASE64 algorithm to encrypt the data;

encrypting the encrypted data repeatedly five times by adopting AES symmetric encryption algorithm to get the final encrypted data.

2. The method of batch automatic network configuration of WiFi devices according to claim 1, wherein the network configuration data comprises configuration information of several AP hotspots finally connected.

3. A non-transitory computer-readable storage medium, wherein the computer-readable storage medium comprises a stored computer program, wherein when the computer program is running, the device on which the computer-readable storage medium is located is controlled to perform the method of batch automatic network configuration of WiFi devices according to claim 2.

4. The method of batch automatic network configuration of WiFi devices according to claim 1, wherein said calculating whether the AP hotspot currently searched is the network configuration AP hotspot by adopting key conversion algorithm is specifically:
   obtaining BSSID, encryption mode and support rate information of the AP hotspot currently searched;
   combining public information of the AP hotspot with manufacturer specific key thereof to perform BASE64 conversion;
   hashing the BASE64 conversion result by adopting SHA algorithm to get corresponding hash result;
   selecting a part of specific bits in the hash result and convert them to a string which is used as a hotspot name, and selecting another part of specific bits in the hash result as a WiFi password.

5. A non-transitory computer-readable storage medium, wherein the computer-readable storage medium comprises a stored computer program, wherein when the computer program is running, the device on which the computer-readable storage medium is located is controlled to perform the method of batch automatic network configuration of WiFi devices according to claim 4.

6. A non-transitory computer-readable storage medium, wherein the computer-readable storage medium comprises a stored computer program, wherein when the computer program is running, the device on which the computer-readable storage medium is located is controlled to perform the method of batch automatic network configuration of WiFi devices according to claim 1.

7. A terminal equipment for batch automatic network configuration of WiFi devices, wherein the terminal equipment comprises:
   an AP deploying module, which is configured to deploy a network configuration AP hotspot for configuration and distribution and release a network configuration signal;
   a matching module, which is configured to search the network configuration signal after the device to be configured enter network configuration state, and calculate whether the AP hotspot currently searched is the network configuration AP hotspot by adopting key conversion algorithm; if yes, the device to be configured connects to the network configuration AP hotspot;
   a network configuration module, which is configured to download network configuration data in the network configuration AP hotspot through file transfer protocol, decrypt and verify the network configuration data, update network configuration settings, and complete the network configuration after the device to be configured successfully connects to the network configuration AP hotspot;
   an encryption module, which is configured for encrypting the configuration data of the network configuration AP hotspot by adopting a multi-layer encryption mode;
   wherein said encrypting the configuration data of the network configuration AP hotspot by adopting a multi-layer encryption mode is specifically:
   calculating CRC32 check sum of the data to be encrypted, and placing the check sum in the head of the network configuration data;
   using BASE64 algorithm to encrypt the data;
   encrypting the encrypted data repeatedly five times by adopting AES symmetric encryption algorithm to get the final encrypted data.

8. The terminal equipment for batch automatic network configuration of WiFi devices according to claim 7, wherein said calculating whether the AP hotspot currently searched is the network configuration AP hotspot by adopting key conversion algorithm is specifically:
   obtaining BSSID, encryption mode and support rate information of the AP hotspot currently searched;
   combining public information of the AP hotspot with manufacturer specific key thereof to perform BASE64 conversion;
   hashing the BASE64 conversion result by adopting SHA algorithm to get corresponding hash result;
   selecting a part of specific bits in the hash result and convert them to a string which is used as a hotspot name, and selecting another part of specific bits in the hash result as a WiFi password.

9. A method of batch automatic network configuration of WiFi devices, wherein the method at least comprises the following steps:
   deploying a network configuration AP hotspot for configuration and distribution and releasing a network configuration signal;
   searching the network configuration signal after the device to be configured enters network configuration state, and calculating whether the AP hotspot currently searched is the network configuration AP hotspot by adopting key conversion algorithm;
   if yes, the device to be configured connecting to the network configuration AP hotspot;
   after the device to be configured successfully connects to the network configuration AP hotspot, downloading network configuration data in the network configuration AP hotspot through file transfer protocol, decrypting and verifying the network configuration data, updating network configuration settings, and completing the network configuration;
   wherein said calculating whether the AP hotspot currently searched is the network configuration AP hotspot by adopting key conversion algorithm is specifically:
   obtaining BSSID, encryption mode and support rate information of the AP hotspot currently searched;
   combining public information of the AP hotspot with manufacturer specific key thereof to perform BASE64 conversion;
   hashing the BASE64 conversion result by adopting SHA algorithm to get corresponding hash result;
   selecting a part of specific bits in the hash result and convert them to a string which is used as a hotspot name, and selecting another part of specific bits in the hash result as a WiFi password.

10. The method of batch automatic network configuration of WiFi devices according to claim 9, wherein the method further comprises:
    encrypting the configuration data of the network configuration AP hotspot by adopting a multi-layer encryption mode.

11. A non-transitory computer-readable storage medium, wherein the computer-readable storage medium comprises a stored computer program, wherein when the computer program is running, the device on which the computer-readable storage medium is located is controlled to perform the method of batch automatic network configuration of WiFi devices according to claim 10.

12. The method of batch automatic network configuration of WiFi devices according to claim 9, wherein the network configuration data comprises configuration information of several AP hotspots finally connected.

13. A non-transitory computer-readable storage medium, wherein the computer-readable storage medium comprises a stored computer program, wherein when the computer program is running, the device on which the computer-readable storage medium is located is controlled to perform the method of batch automatic network configuration of WiFi devices according to claim 12.

14. A non-transitory computer-readable storage medium, wherein the computer-readable storage medium comprises a stored computer program, wherein when the computer program is running, the device on which the computer-readable storage medium is located is controlled to perform the method of batch automatic network configuration of WiFi devices according to claim 9.

* * * * *